April 4, 1961 W. J. MAYNARD 2,977,987
VALVE STRUCTURE

Filed Feb. 3, 1958 2 Sheets-Sheet 1

INVENTOR.
WALLACE J. MAYNARD
BY
Christie, Parker & Hale
ATTORNEYS.

April 4, 1961 W. J. MAYNARD 2,977,987
VALVE STRUCTURE
Filed Feb. 3, 1958 2 Sheets-Sheet 2

INVENTOR.
WALLACE J. MAYNARD
BY Christie, Parker & Hale
ATTORNEYS.

United States Patent Office 2,977,987
Patented Apr. 4, 1961

2,977,987

VALVE STRUCTURE

Wallace J. Maynard, 6219 San Ricardo Way, Buena Park, Calif.

Filed Feb. 3, 1958, Ser. No. 712,706

3 Claims. (Cl. 137—625.17)

This invention relates to a valve structure and particularly to a valve structure adaptable for mixing fluids.

Optimum utilization of a valve structure requires that the characteristic of repetitive effective sealing throughout a prolonged period of continuous use be combined with simplicity and economy of construction and maintenance. In addition, where a valve is to be used for mixing two or more fluids from separate sources, it is particularly desirable that variations in the mixing proportions be producible without change in the total volume of fluid outflow. A corollary requirement for a mixing valve is that a constant mixing proportion be maintainable while changes in the total volume of outflow are effected.

The valve structure of this invention incorporates in particular the advantages of dependable sealing effectiveness, ease of maintenance, and, as a mixing valve, the characteristics of mixing in various proportions at constant volume and changing of outflow volume at a constant mixing proportion.

The valve structure according to the invention comprises a body defining passages for both fluid inflow and fluid outflow as well as a cylindrical bore. These flow passages open separately into the cylindrical bore. A cylinder slidably fitted in the bore has a slotted portion in its surface. Means are provided by which the cylinder may be rotated within the cylindrical bore or moved along the longitudinal axis of the bore. Within the inflow passage, a removable constricting means is slidably fitted. A sealing means forms a fluid-tight seal in the annulus formed between the constricting means and the wall of the inflow passage. The constricting means has a longitudinal opening which extends from end to end. One end face is curved to fit the curvature of the cylinder.

The slotted portion of the cylinder is placed along the longitudinal length of the cylinder whereby a part of the slotted portion mates with the opening of the constricting means when the valve is in a flow-enabling position. In addition, the slotted portion of the cylinder is formed so that longitudinal movements of the cylinder both reciprocally and incrementally change the area available for flow from full open to full closed.

In the valve structure according to the invention the application of pressure against the end of the constricting means opposite the curved end urges the constricting means against the cylinder. In this manner the sealing surface formed between the curved end face of the constricting means and the surface of the cylinder is continually lapped into close sealing contact as the cylinder is rotated in the course of its use. Therefore, the sealing surface is continually adjusted throughout the use of the valve so that effective sealing is achieved for prolonged periods of time. When excessive wear of the constricting means does occur, a new constricting means may be readily and simply substituted for the existing part.

When the valve structure according to the invention is used as a mixing valve, two inflow passages, each supplying a fluid from a separate source, are provided in the valve body. A constricting means having a longitudinal opening from end to end is slidably fitted within each inflow passage. The opening of each constricting means mates with a part of the slotted portion of the cylinder when the valve is in a flow-enabling position. In one embodiment the slotted portion of the cylinder is in flow-enabling engagement with one-half of each constricting means opening when the flow contribution from each of the inflow passages is equal. A rotational movement of the cylinder from this position diminishes the flow contribution from one inflow pasage and increases the flow contribution from the other inflow passage. By properly shaping the cross-sectional areas of the slotted portion of the cylinder and the opening in the constricting means, the total area available for flow may be maintained constant while the proportionate flow contribution from each inflow passage is varied. In addition, a given proportion to flow contribution from the two flow passages may be maintained while the total volume is incrementally diminished or increased by reciprocal longitudinal movement of the cylinder.

It can be seen that the valve structure according to the invention offers important advantages both in providing an effective sealing means and in providing an effective method for mixing fluids. While not necessarily so limited, the valve structure according to the invention is described below in an embodiment where two inflow passages are provided for mixing of two fluids. It is to be understood, however, that the sealing means of the valve structure according to the invention can also be used for flow of one fluid in a single inflow passage.

The valve structure according to the invention and its manner of operation will be more readily understood from the following description taken in conjunction with the accompanying drawings in which.

Figure 1:
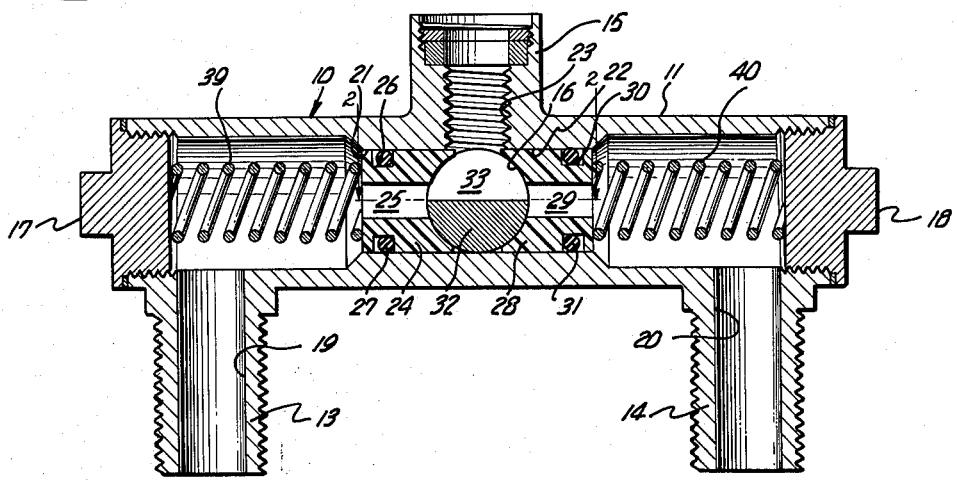
Fig. 1 is a sectional elevation of a preferred embodiment of the valve structure.
Figure 2:
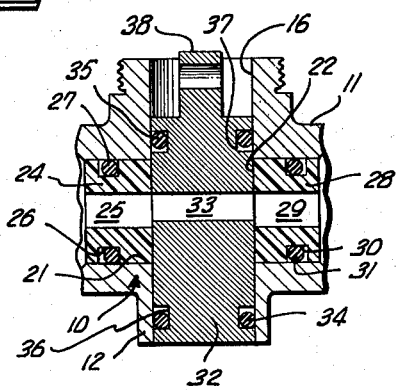
Fig. 2 is a fragmentary plan section of the embodiment of Fig. 1 generally taken along line 2—2 of Fig. 1.

With reference to Figs. 1 and 2 a preferred embodiment of a mixing valve employing the valve structure according to the invention is shown. A valve body 10 comprises an elongated horizontal member 11 having an enlarged intermediate portion 12, first and second vertical risers 13 and 14 joined on one side of the horizontal member to its opposite ends, and a third vertical riser 15 joined on the opposite side of the horizontal member to its enlarged intermediate portion. The first and second vertical risers may be provided with external threads to permit coupling with first and second fluid sources respectively. The third vertical riser may be provided with an internal thread to permit coupling with an outflow means such as, for example, a swing spout.

A cylindrical bore 16 traverses the enlarged portion of the horizontal member and is substantially normal to the longitudinal axis of the horizontal member. The horizontal member has a partially hollowed-out interior, the hollowed-out portion intersecting and opening into the cylindrical bore from opposite sides. Caps 17 and 18, threaded into opposite ends of the horizontal member, provide end closures for the hollowed-out interior. A first inflow bore 19 formed within the first vertical riser opens into the interior of the horizontal member on one side of the cylindrical bore to form in combination a first fluid inflow passage. A second inflow bore 20 formed within the second vertical riser opens into the interior of the horizontal member on the other side of the cylindrical bore to form in combination a second fluid inflow passage. Both fluid inflow passages are identical with the exception that they open into the cylindrical bore from opposite sides. Portions of the inflow passages opening into the cylindrical bore, hereinafter referred to as insert chambers 21 and 22, have a circular cross-section with a diameter less than the remaining interior portion of the horizontal member. An outflow bore 23 formed within the third vertical riser opens into the cylindrical bore spaced approximately 90° from each of the insert chamber openings and vertically coplanar therewith.

Figure 3:
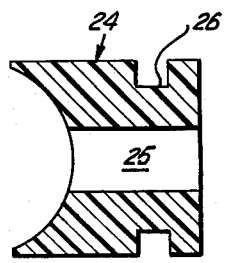
Fig. 3 is a sectional elevation of the insert plug of Fig. 1 removed from the valve body.

Within the insert chamber of the first fluid inflow passage, a first insert plug 24 is slidably fitted. A square central longitudinal opening 25 extends from one end of the insert plug to the other end. A circumferential recess 26 is formed in the plug and an O ring 27 is fitted within the recess to form a fluid-tight seal between the wall of the insert chamber and the insert plug. In Fig. 3, a sectional view of the insert plug of Fig. 1, removed from the valve body, is shown. Identical parts are described by the same reference characters used to describe insert plug 24 in Figs. 1 and 2. One end face of the insert plug is flat while the opposite end face is curved.

A second insert plug 28, having a square central longitudinal opening 29 and a circumferential recess 30 and identical to the first insert plug, is fitted within the insert chamber of the second fluid inflow passage. An O ring 31 is fitted within the recess to form a fluid-tight seal between the wall of the insert chamber and the plug.

Figure 4:
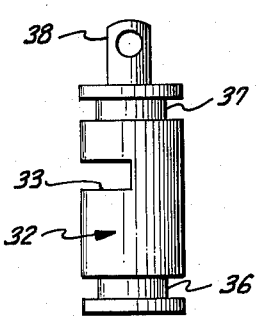
Fig. 4 is a side view of the cylinder of Fig. 1 removed from the valve body.

A cylinder 32, having a length less than the length of the cylindrical bore, is slidably fitted within the bore. A side view of the cylinder, removed from the valve body, is shown in Fig. 4 in which identical parts are described by the same reference characters used in conjunction with Figs. 1 and 2. A semi-circular segmental slot 33 is cut in the cylinder transverse to its longitudinal axis. The slot is longitudinally placed along the cylinder so that in one position, hereinafter referred to as the "full open" position, the entire width of the slot coincides with a portion of each insert plug opening. The width of the segmental slot is such that a longitudinal movement of the cylinder within the cylindrical bore, displacing it from the full open position to another position, hereinafter referred to as the "full closed" position, results in no portion of the slot coinciding with the insert plug openings. O rings 34 and 35 are fitted within circumferential recesses 36 and 37 located at opposite ends of the cylinder. In this manner, a fluid-tight seal between the cylinder and the wall of the cylindrical bore is provided at both ends of the cylinder. A tab 38 joined to one end of the cylinder provides a connection for fitting lever means for imparting rotational and longitudinal movements to the cylinder.

The curvature of one end face of each insert plug is adapted to fit the curvature of the cylindrical surface. The effect of a force acting against the opposite flat face of each insert plug is to press the curved face of the plug into sealing engagement with the surface of the cylinder. In the use of the valve, this force is supplied by inflow fluid pressure. However, to maintain the insert plugs in proper position in the absence of fluid pressure, resilient springs 39 and 40 are compressed between insert plug 24 and cap 17, and insert plug 28 and cap 18, respectively. In order to promote maximum sealing contact between the insert plugs and the cylinder, the insert plugs are preferably made of a material having a slight resilience. Organic plastics such as polytetrafluoroethylene or certain polyamides are particularly suited for this purpose. Various other plastics and metals may be satisfactorily utilized.

The operation of the valve to vary the proportion of flow contribution from the first and second fluid inflow passages respectively may be best understood by reference to Fig. 1 previously described. When the flow contribution from each of the flow passages is equal, the segmental slot of the cylinder is positioned so that it is in flow-enabling engagement with one-half of each of the insert plug openings. The remaining halves of the insert plug openings are pressed against the blank surface of the cylinder. In this position, the segmental slot provides flow communication between each of the inflow passages and the outflow bore and also acts as an initial mixing chamber. The proportionate flow contribution of the two inflow passages may be varied by rotating the cylinder in either a clockwise or counter-clockwise direction. For example, a clockwise rotation of the cylinder from the position shown in Fig. 1 increases the area of insert plug opening 29 in flow-enabling engagement with the segmental slot and proportionately decreases the area of insert plug opening 25 in flow-enabling engagement with the slot. The proportion of fluid from the second inflow passage in the outflow mixture is correspondingly increased. Since, however, the insert plug openings of the preferred embodiment of the valve are square, the total area in flow-enabling engagement with the slot remains constant. In this manner, the total volume of outflow fluid remains constant although the proportionate flow contribution from the two inflow passages is varied. In addition, small changes in the mixing proportion may be readily made.

The operation of the valve to vary the total volume of fluid outflow without affecting a previously-set mixing proportion may be readily understood by reference to Fig. 2 previously described. In the position shown, the valve is fully open since the entire width of the slot is in flow-enabling engagement with the two insert plug openings. A longitudinal outward movement of the cylinder (upwardly as shown in the drawing) decreases the total area in flow-enabling engagement with the insert plug openings while the area of the slot in engagement with each of the insert plug openings remains proportionately the same. By longitudinal movements of the cylinder, the total outflow of fluid may be incrementally increased or decreased or it may be completely stopped.

Figure 5:
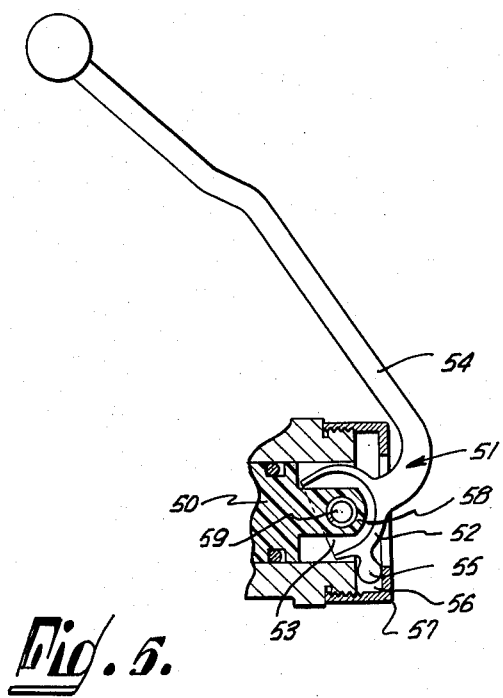
Fig. 5 is a fragmentary sectional elevation showing an embodiment of means for moving the cylinder of the valve structure.

With reference to Fig. 5 an embodiment of lever means for producing both longitudinal and rotational movements of a cylinder 50 in a valve structure according to the invention is shown. A lever arm 51 comprises a U-shaped portion 52, closed on one side by a plate 53, joined to a handle 54 angularly inclined with respect to the U-shaped portion. A rounded ear 55 projects from the U-shaped portion and is fitted in a circular channel 56 formed between the valve body and a cap 57. A tab 58, projecting from one end of the cylinder, is joined to the plate by a pin 59, the U-shaped portion being formed to permit its rotational movement around the tab.

To move the cylinder longitudinally, the handle is moved in the direction of the longitudinal axis of the cylinder. For example a movement of the handle to the right from the position shown in Fig. 5 withdraws the cylinder from the valve body by producing a clockwise rotational movement of the U-shaped portion pivoted on the rounded ear. In the preferred embodiment of the valve structure according to the invention, an arc of approximately 43° described by the handle produces a longitudinal displacement of the cylinder of 5/16 inches and changes the cylinder position from full open to full closed.

To rotate the cylinder to vary the mixing proportion, the handle moved transversely with respect to the longitudinal axis of the cylinder.

Figure 6:
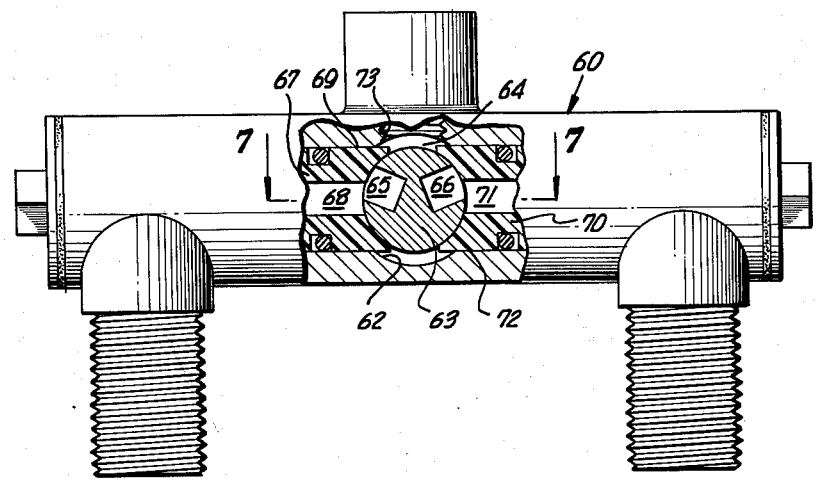
Fig. 6 is an elevation view, partially broken away and sectioned, of another embodiment of the valve structure according to the invention.
Figure 7:
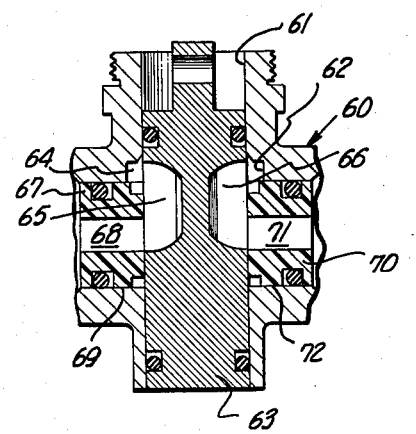
Fig. 7 is a fragmentary plan section of the embodiment of Fig. 6 generally taken along line 7—7 of Fig. 6.

With reference to Figs. 6 and 7, another embodiment of the valve structure according to the invention is shown. A valve body 60 is identical to the valve body described in conjunction with Figs. 1 and 2 with the exception that an identically-positioned cylindrical bore 61 has an intermediate portion 62 with a diameter greater than the end portions. A cylinder 63, slidably fitted within the end portions of the cylindrical bore, forms an annulus 64 with the intermediate enlarged portion of the bore. Longitudinal grooves 65 and 66 are formed in opposite sides of the cylinder. A first insert plug 67, having a square longitudinal opening 68, is fitted in a first fluid inflow passage 69 so that its curved face is in sealing contact with one side of the surface of the cylinder. A second insert plug 70, having a square longitudinal opening 71, is fitted in a second fluid inflow passage 72 so that its curved face is in sealing contact with the opopsite side of the surface of the cylinder.

Each groove of the cylinder is placed along the length of the cylinder so that in a full open position a portion of the groove mates with an insert plug opening, the remaining portion of the groove extending beyond the peripheral edge of the insert plug to open into the annulus. Therefore, in this position, flow from each inflow passage passes through its respective insert plug opening and cylinder groove and into the annulus. The fluids are mixed in the annulus and pass into an outflow bore 73 opening into the annulus.

Each cylinder groove is angularly inclined so that, as particularly shown in Fig. 6, one half of each groove is in flow-enabling engagement with corresponding halves of the insert plug openings when the flow contribution from each of the inflow passages is equal. A rotational movement of the cylinder thereupon changes the mixing proportion in the same manner as previously described without changing the total volume of fluid outflow. Changes in volume of fluid outflow at a constant mixing proportion are effected by a longitudinal movement of the cylinder as previously described.

In the embodiments previously described, the use of square insert plug openings has permitted the proportionate contribution from each inflow passage to be varied without affecting the total volume outflow. It can be seen that, for certain purposes, special mixing effects can be produced by changing the shape of either the insert plug openings or the slotted portion of the cylinder. If, for example, the segmental slot of the cylinder described in Fig. 1 is formed so that the slot is in flow mating engagement with the entire cross-sectional area of each opening when the flow contribution of each inflow passage is equal, a rotational movement of the cylinder decreases the flow contribution of one inflow passage and maintains constant the flow contribution of the second inflow passage. Similarly, if the openings in the insert plugs were formed in the shape of equal triangles, inverted with respect to each other, it would be possible to control both the ratio of mixing and the volume simultaneously. Such modifications in the forms of the flow openings all come within the basic concept of this invention.

The valve structure according to the invention possesses the advantages that it is self-lapping and self-adjusting as continued rotation of the cylinder occurs through use of the valve. In addition, the use of a slot or grooves in the cylinder permits the valve to be readily cleaned of grit and dirt since such foreign particles may be readily flushed from the valve by placing the slotted portion of the cylinder in full flow-enabling engagement with the insert plug openings. When used as a mixing valve, the valve structure possesses the advantage that it eliminates the danger of a fluid from one inflow passage entering the other inflow passage. This is because any leaks due to excessive wear result in the bypassing fluid passing into the outflow passage rather than into the other inflow passage.

The ease with which the insert plug according to the invention may be moved and replaced combined with the self-sealing characteristic of the insert plug makes this valve structure adaptable to uses involving the flow of single fluids. This advantage coupled with the apparent advantages with relation to mixing create a wide number of uses for the valve according to the invention.

I claim:

1. A valve structure comprising a body defining two fluid inflow passages, a fluid outflow passage and a cylindrical bore having an intermediate portion of enlarged cross-sectional area, the inflow passages opening into the enlarged portion of the cylindrical bore from substantially opposite sides and the outflow passage opening into the enlarged portion of the cylindrical bore between the inflow passages, a cylinder fitted in the bore to be slidable in the end portions and having two grooves on opposite sides, means adapted to rotate the cylinder and to move it along the longitudinal axis of the bore, a removable insert plug slidably fitted within each of the inflow passages, and fluid-sealing means between the surface of each insert plug and the wall of its inflow passage, each insert plug having a longitudinal opening extending from end to end and a curved end face fitted to the curvature of the cylinder, the curved end face of each insert plug being urged against the cylinder in sealing engagement by a force applied against the opposite end face of the insert plug, the cylinder grooves longitudinally extending along the cylinder whereby, in a position enabling flow from the inflow passages to the outflow passages, a portion of each groove mates with a respective insert plug opening and the remaining portion of each groove extends beyond its respective insert plug to an annulus formed between the cylinder and the enlarged portion of the bore, the cylinder grooves being formed whereby a rotational movement of the cylinder changes the proportion of flow contributed from the inflow passages and a longitudinal movement of the cylinder reciprocally and incrementally changes the area available for flow from full flow-enabling engagement to no flow-enabling engagement between the grooves and the insert plug openings.

2. Apparatus in accordance with claim 1 wherein the cylinder grooves are in flow-enabling engagement with corresponding halves of their respective insert plug openings when the flow contribution from each of the inflow passages is equal.

3. Apparatus in accordance with claim 1 wherein the insert plugs are formed from a resilient organic plastic material.

References Cited in the file of this patent

UNITED STATES PATENTS

| | | |
|---|---|---|
| 713,144 | Pierce | Nov. 11, 1902 |
| 1,027,178 | Caskey | May 21, 1912 |
| 1,148,455 | Kenney | July 27, 1915 |
| 2,087,223 | Thompson | July 13, 1937 |
| 2,419,481 | Carbon | Apr. 22, 1947 |
| 2,578,396 | Brown | Dec. 11, 1951 |
| 2,628,809 | Mikeska | Feb. 17, 1953 |
| 2,679,865 | Griffith | June 1, 1954 |
| 2,684,691 | Strickler | July 27, 1954 |
| 2,839,083 | Moen | June 17, 1958 |